US008728362B2

(12) United States Patent
Knapp

(10) Patent No.: US 8,728,362 B2
(45) Date of Patent: May 20, 2014

(54) METHOD FOR PRODUCING REINFORCED PLASTIC PROFILES HAVING IMPROVED THERMAL INSULATION FOR WINDOW CONSTRUCTION

(75) Inventor: Wolf D. Knapp, Bad Camberg (DE)

(73) Assignee: Sika Technology AG, Baar (CH)

(*) Notice: Subject to any disclaimer, the term of this patent is extended or adjusted under 35 U.S.C. 154(b) by 248 days.

(21) Appl. No.: 12/742,330

(22) PCT Filed: Nov. 13, 2008

(86) PCT No.: PCT/EP2008/065432
§ 371 (c)(1),
(2), (4) Date: May 11, 2010

(87) PCT Pub. No.: WO2009/062986
PCT Pub. Date: May 22, 2009

(65) Prior Publication Data
US 2010/0281811 A1 Nov. 11, 2010

(30) Foreign Application Priority Data

Nov. 13, 2007 (EP) .................................... 07120596

(51) Int. Cl.
*B29C 67/20* (2006.01)
(52) U.S. Cl.
USPC .................. 264/45.9; 264/171.13; 264/173.16
(58) Field of Classification Search
USPC ............................... 264/45.9, 171.13, 173.16
See application file for complete search history.

(56) References Cited

U.S. PATENT DOCUMENTS

| 2,983,962 | A | 5/1961 | Merz et al. |
| 3,327,030 | A | 6/1967 | Reifenhauser |
| 5,266,133 | A | 11/1993 | Hanley et al. |
| 5,373,027 | A | 12/1994 | Hanley et al. |
| 5,728,330 | A | 3/1998 | Erwin et al. |
| 6,387,470 | B1 | 5/2002 | Chang et al. |
| 2005/0081475 | A1* | 4/2005 | Edger et al. ..................... 52/698 |
| 2008/0070459 | A1* | 3/2008 | Howells ......................... 442/22 |

FOREIGN PATENT DOCUMENTS

| DE | 100 51 257 A1 | 4/2002 |
| EP | 0 204 970 B1 | 12/1990 |
| JP | A-10-291244 | 11/1998 |
| JP | A-2004-34559 | 2/2004 |
| WO | WO 2005/080524 A1 | 9/2005 |

OTHER PUBLICATIONS

Written Opinion of the International Searching Authority issued on Feb. 20, 2010 in International Application No. PCT/EP2008/065432.
International Search Report issued on Feb. 20, 2009 in International Application No. PCT/EP2008/065432 (with translation).
Notice of Reasons for Rejection dated Feb. 12, 2013 from Japanese Patent Application No. 2010-533570 (with English-language translation).

* cited by examiner

*Primary Examiner* — James Sanders
(74) *Attorney, Agent, or Firm* — Oliff PLC

(57) ABSTRACT

The present invention relates to a method for producing plastic profiles having a foam core in a coextrusion method, a material which can be foamed being co-extruded into the cavity of a plastic hollow profile, in particular in the solid state, and foamed therein. The method according to the invention is suitable in particular for the production of sash and frame profiles of windows.

15 Claims, 2 Drawing Sheets

METHOD FOR PRODUCING REINFORCED PLASTIC PROFILES HAVING IMPROVED THERMAL INSULATION FOR WINDOW CONSTRUCTION

TECHNICAL FIELD

The invention is based on a process for producing plastics profiles with a foamed core in a coextrusion process wherein a foamable material in the solid state is coextruded into the cavity of the hollow plastics profile and foamed therein. These profiles are particularly suitable as profiles for the frame and/or leaf of windows, doors, and the like. The invention is also based on a plastics profile produced by a process described above.

PRIOR ART

Extruded hollow plastics profiles are often stiffened by inserting steel profiles into the cavity of a hollow plastics profile. These reinforced plastics profiles are often used as profiles for the frame or leaf of windows, doors, and the like. The plastic used here is mostly polyvinyl chloride (PVC). The disadvantage of these plastics profiles reinforced with steel profiles is inter alia that the use of metals in the interior of the plastics profile considerably impairs thermal insulation. The reason for this is that metals generally have good thermal conductivity. In order to achieve improved thermal insulation, the hollow chamber of the steel profile which is inserted into the plastics profile is filled with a foamable material, for example with a polyurethane foam. However, the subsequent filling of a hollow profile with foam has proven to be very inconvenient, because the length of extruded window profiles in particular is usually a plurality of meters, and a long probe then has to be used for the foam-filling process.

It is not possible simply to omit metal profiles for reinforcement of plastics profiles, because stiffness would be inadequate.

In order nevertheless to omit metal in the interior of the PVC profile, thermally insulating reinforcement profiles produced from fiber-reinforced composite materials and filled with polyurethane foam have more recently been used. The disadvantage of these profiles is the complicated production process, in which the core profile is produced separately from the exterior profile, and is inserted into the exterior profile only after manufacture.

BRIEF DESCRIPTION OF THE INVENTION

The invention is based on the object of providing a simple process for producing plastics profiles, where the mechanical properties of these, and also the thermal insulation properties, are improved over the prior art.

The invention achieves this via a process for producing plastic profiles with a foamed core in a coextrusion process, wherein a foamable material in the solid state is coextruded into the cavity of a hollow plastics profile and foamed therein.

The essence of the invention is therefore a process for producing plastics profiles with a foamed core in a coextrusion process, where a foamable material, in particular in the solid state, is coextruded into the cavity of a hollow plastics profile, and is foamed therein.

The coextrusion process is in particular characterized in that
i) a plastic in the solid state is charged to a first heatable extruder;
ii) the plastic is melted and compressed during conveying by means of conveying screw in the direction of the die;
iii) the molten plastic is extruded through the die to give a hollow profile;
iv) a solid, foamable material is charged to a second extruder;
v) the foamable material in the solid state is conveyed by means of a conveying screw in the direction of the die;
vi) the foamable material in the solid state is conveyed into the cavity of the coextruded plastics profile;
vii) the foamable material is foamed to completion within the interior of the plastics profile.

The advantages of the invention are inter alia that the profiles of the invention can be produced via coextrusion, in a simple process. The length selected for the profiles here can be as desired, and it is possible to produce even very long profiles without additional effort, since there is no need for subsequent introduction of the foamable material or the foam into the hollow plastics profiles.

Other advantages are the improved mechanical properties, and also the improved thermal insulation of the plastics profiles which are produced via the process of the invention. These properties can also be influenced via the selection of the foamable material.

Another advantage of the present process is that when a thermally foamable material is used the foaming of this material can be achieved by using the heat available from the extrusion of the plastics profile. There is therefore no need to introduce further energy for the foaming process.

Further aspects of the invention are the subject matter of further independent claims. Particularly preferred embodiments of the invention are the subject matter of the dependent claims.

BRIEF DESCRIPTION OF THE DRAWINGS

Examples of the invention are explained in more detail below, using the drawings. The same reference symbols are used for the same elements in the various figures.

The elements shown are only those essential to immediate understanding of the invention. There is, of course, no restriction of the invention to the examples shown and described.

METHODS OF WORKING THE INVENTION

In the present document, substance names that begin with "poly", e.g. polyisocyanate, polyurethane, polyester, or polyol, indicate substances which formally contain, per molecule, two or more of the functional groups that occur in their name.

In the present document, the term "polymer" encompasses a universe of macromolecules which have chemical uniformity but differ in respect of degree of polymerization, molar mass, and chain length, produced via a polymerization reaction (addition polymerization, polyaddition, polycondensation). The term also encompasses, on the other hand, derivatives of this type of universe of macromolecules derived from polymerization reactions, i.e. compounds that have been obtained via reactions, for example addition reactions or substitution reactions, of functional groups on existing macromolecules, and which can have chemical uniformity or chemical nonuniformity. The term also encompasses what are known as prepolymers, i.e. reactive oligomeric preadducts, the functional groups of which participate in the construction of macromolecules.

The term "polyurethane polymer" encompasses all of the polymers that are produced by what is known as the diisocyanate polyaddition process. Polymers included here also include those that are almost or entirely free from urethane groups. Examples of polyurethane polymers are polyether polyurethanes, polyester polyurethanes, polyether polyureas, polyureas, polyester polyureas, polyisocyanurates, and polycarbodiimides.

In this document, a "hollow plastics profile" (also termed "exterior profile") is the term used for an elongate hollow plastics body, the length of which is generally substantially larger than its cross section. In a coextrusion process in which a second material is coextruded into the interior of said hollow body, whereupon the hollow body becomes completely filled, the term hollow plastics profile refers only to said exterior plastics body. The interior material is termed "core". In the present document, the term "plastics profile" indicates the entire element, i.e. the hollow plastics profile inclusive of core.

Figure 1:
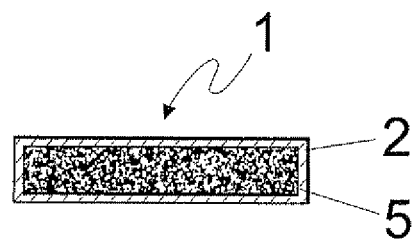
FIG. 1 is a diagram of the cross section of a plastics profile.
Figure 2:
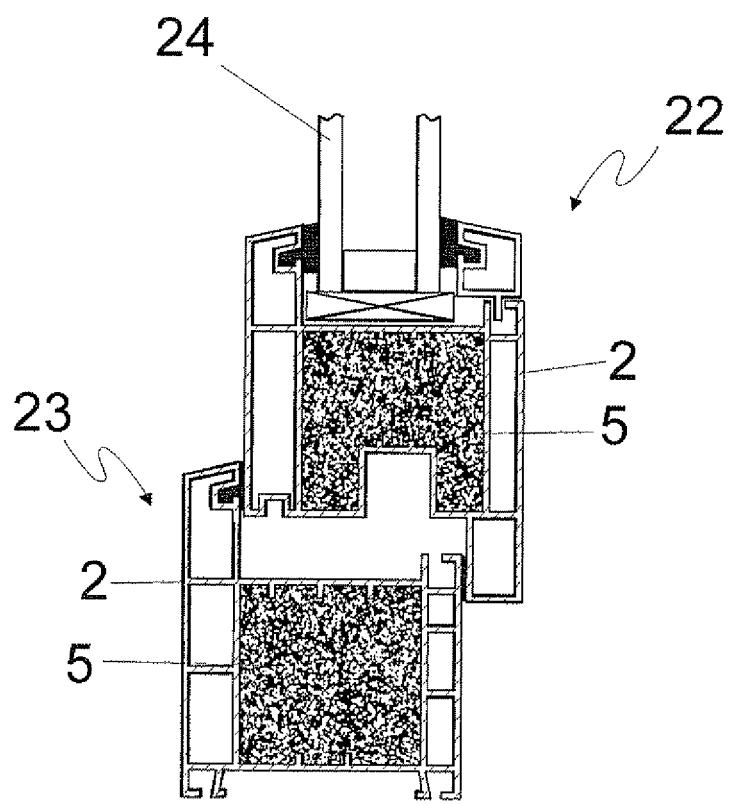
FIG. 2 is a diagram of the cross section of a window profile.

FIGS. 1 and 2 are diagrams of plastics profiles 1 produced by a process of the invention and composed of a hollow plastics profile 2 or exterior profile and of a core 5 made of a foamed material.

FIG. 1 here is a diagram of a simple form of this type of plastics profile 1 with a rectangular cross-sectional shape. Plastics profiles of this type are suitable by way of example as slats for plastics venetian blinds and the like.

FIG. 2 is a diagram of a plastics profile of the invention in the form of preferred embodiment: a window profile encompassing a frame-profile 23 and a leaf-profile 22, which surrounds the glass pane 24 of the window. Both the leaf-profile 22 and the frame-profile 23 have a foamed core 5, and were produced in a process of the invention. The window profile has, alongside the cavity filed with foam, further cavities not filled with foam. It is, of course, possible to select a different subdivision of the cavities within the interior of the window profile, and it is also possible here that further cavities have been filled with the foamable material. In a coextrusion process of the invention, appropriate selection of the die 12 can be used to achieve almost any desired subdivision of the cavities, and to achieve optional filling of these with foam. An advantage of window profiles of this type is that they exhibit very good thermal insulation with very high stiffness. This is attributable firstly to the fact that neither the leaf-profile nor the frame-profile of the window includes, as reinforcement in the interior, any metal profiles, such as steel profiles. Secondly, the good thermal insulation is also attributable to the thermal insulation properties of the foamed core 5.

In addition to the high stiffness and the very good thermal insulation, acoustic insulation is also improved in the plastics profiles produced in a process of the invention, and this is an additional advantage particularly in window construction.

By analogy with the window profile in FIG. 2, a single- or two-part plastics profile of this type can be used by way of example for doors, gates, flaps, hatches, and the like.

These plastics profiles are obtained in a coextrusion process by coextruding a foamable material in the solid state into the interior of an extruded hollow plastics profile, where it is foamed.

Suitable plastics for producing the hollow plastics profiles are typically plastics that can be processed thermoplastically, e.g. polyvinyl chloride (PVC), in particular rigid PVC (also termed UPVC or "unplasticized PVC"), or polypropylene (PP), polymethyl (meth)acrylate (PMMA), polycarbonate (PC), or other suitable thermoplastics. PVC, preferably rigid PVC, is particularly suitable. One reason for this inter alia is the weathering resistance of PVC and the possibility associated therewith of exterior use.

The plastic for producing the hollow plastics profiles can also comprise additional constituents, examples being stabilizers, such as heat stabilizers and light stabilizers, impact modifiers, plasticizers, flame retardants, antistatic agents, fillers, fibers, such as glass fibers or carbon fibers, dyes, or pigments. Particularly when rigid PVC is used, it is necessary to add stabilizers, since rigid PVC is heat-sensitive, and starts to decompose at temperatures of about 140° C.

The foamable material used for the core of the plastics profile can in principle comprise any desired material which can be induced to foam controllably and which has reinforcement properties. It is preferable that the foamable material is foamed thermally, via moisture, or via electromagnetic radiation.

This type of foamable material typically has a chemical or physical blowing agent. Chemical blowing agents are organic or inorganic compounds which decompose on exposure to heat, moisture, or electromagnetic radiation, where at least one of the decomposition products is a gas. Physical blowing agents that can be used are by way of example compounds which are converted to the gaseous phase when the temperature increases. Both chemical and physical blowing agents are therefore capable of generating foam structures in polymers.

The foamable material is most preferably foamed thermally, at a temperature ≤160° C., in particular from 80° C. to 150° C., preferably from 90° C. to 140° C., using chemical blowing agents. Examples of suitable chemical blowing agents are azodicarbonamides, sulfohydrazides, hydrogen carbonates, and carbonates.

Other examples of suitable blowing agents are commercially available with trademark EXPANCEL® (acrylic copolymer, isobutene and water) from Akzo Nobel, the Netherlands, or with trademark CELOGEN® (azodicarbonamide and silicon dioxide) from Chemtura Corp., USA.

The heat required for the foaming process can be introduced via external or internal heat sources, for example an exothermic chemical reaction.

In a most preferred embodiment of the process of the invention for producing plastics profiles, the foaming of the foamable material is achieved thermally and in particular in that, after the coextrusion process or after leaving the die, the foamable material comes into contact with the inner walls of the hollow plastics profile and is thus exposed to a temperature sufficiently high for the foaming procedure, and is thus softened and foamed to completion.

The advantage of said preferred embodiment is that no separate energy sources are required for the foaming of the foamable material, but instead the heat dissipated from the extruded hollow plastics profile can be used for the foaming process.

Preference is moreover in particular given to foamable materials which use the heat dissipated from the extruded hollow plastics profile not only for the foaming process but also for the hardening of the foam. This means that heat-activatable curing agents or other chemically or physically blocked compounds, which may be present in the foamable material, examples being blocked or encapsulated curing agents, which have to be released for the hardening of the foamed material, are likewise deblocked or released by using the heat dissipated from the extruded hollow plastics profile. The intention here is that the hardening of the foamable material is to begin only when a temperature has been reached which is the same as, or above, the foaming temperature of that material, since otherwise the foamable material hardens before the foaming thereof is complete, and it is therefore impossible to ensure that the foamed material has, prior to the hardening process, filled the entire cavity of the plastics profile, and that the foam has a compact structure.

In a most preferred process, the foamable material softens at a temperature below the foaming temperature, in such a way that it cannot be deformed until the foaming procedure begins. Once the foaming temperature has been reached, the foamable material is foamed. Finally, the hardening procedure in particular does not begin until the foaming temperature has been exceeded and the foaming process has at least to some extent been concluded. There is, of course, no sharp boundary between the temperature ranges at which the foamable material softens, foams, and hardens, and these ranges can overlap. By way of example, the foamable material softens at a temperature in the range from 70° C. to 120° C., the foaming procedure takes place at a temperature of from 80° C. to 160° C., and the hardening takes place at a temperature of from 140° C. to 220° C. When the foamable material is selected and produced, care has to be taken that its temperature-dependent properties comply with these requirements of the process, and this means that by way of example the blowing agent and the heat-activatable curing agent have been selected in such a way that they are appropriate for one another, so that the foaming process proceeds before the hardening process.

Another very important factor is that the foamable material of the core and the thermoplastically processable plastic of the hollow plastics profile are appropriate for one another. It is preferable that the foamable material is selected in such a way that the heat dissipated from the extruded hollow plastics profile is sufficient for the softening, foaming, and hardening of the foamable material.

Examples of suitable foamable materials are single-component epoxy resin systems which are not flowable at room temperature and which in particular have relatively high impact resistance, and comprise agents with thixotropic effect, e.g. Aerosils or nanoclays. By way of example, these epoxy resin systems comprise from 20 to 50% by weight of a liquid epoxy resin, from 0 to 30% by weight of a solid epoxy resin, from 5 to 30% by weight of a toughener, from 1 to 5% by weight of physical or chemical blowing agents, from 10 to 40% by weight of fillers, from 1 to 10% by weight of agents with thixotropic effect, and from 2 to 10% by weight of heat-activatable curing agents. Other suitable materials alongside solid epoxy resins are crystalline polyepoxides, such as triglycidyl isocyanurates, diglycidyl ethers of terephthalic acid, mixtures of diglycidyl ether of terephthalic acid with triglycidyl ether of trimellitic acid, diglycidyl ethers of hydroquinone, and also adducts of trimethylolpropane diglycidyl ether with diisocyanates such as diphenylmethane 4,4'-, 2,4'- and 2,2'-diisocyanate (MDI), tolylene 2,4- and 2,6-diisocyanate (ID), or 1-isocyanato-3,3,5-trimethyl-5-isocyanatornethyl-cyclohexane (IPDI).

Suitable tougheners for the foamable material are reactive liquid rubbers based on nitrile rubber, or are derivatives of polyether polyol polyurethanes, or are core-shell polymers, and similar systems known to the person skilled in the art.

Foamable materials that are likewise suitable are single-component polyurethane compositions which comprise blowing agents and which are composed of crystalline polyesters having OH groups in a mixture with other polyols, preferably with polyether polyols, and of polyisocyanates having blocked isocyanate groups. The melting point of the crystalline polyester should be ≥50° C. The isocyanate groups of the polyisocyanate can by way of example have been blocked with nucleophiles, such as caprolactam, phenols, or benzoxalones. Other suitable materials are blocked polyisocyanates, such as those used for example in powder coating technology and available commercially by way of example with trademarks VESTAGON® (uretdione polyisocyanate adduct) BF 1350 and VESTAGON® BF 1540 (uretdione polyisocyanate adduct) from Degussa GmbH, Germany. Other suitable isocyanates are those known as encapsulated or surface-deactivated polyisocyanates, which are known to the person skilled in the art and are described by way of example in the patent EP 0 204 970.

Other suitable foamable materials are two-component epoxy/polyurethane compositions comprising blowing agents, as described by way of example in the patent WO 2005/080524 A1, the disclosure of which is incorporated herein by way of reference.

Other suitable foamable materials are marketed by way of example with the trademark SIKABAFFLE® 240, SIKABAFFLE® 250, or SIKABAFFLE® 255 by Sika Corp., USA, (each is a composition containing an ethylene-α,β ethylenicallv unsaturated carboxylic copolymer at least partially neutralized with a metallic ion, a blowing agent, and a resin based tackifier) and are described in the patents U.S. Pat. Nos. 5,266,133 and 5,373,027, the disclosure of these being incorporated herein by way of reference.

Examples of particularly preferred foamable materials with reinforcement properties are those marketed with trademark SIKAREINFORCER® 941 (composition containing a SBS block co-polymer, a bisphenol A-based liquid epoxy resin, polystyrene resin, a reinforcing agent, a blowing agent, and a curing agent) by Sika Corp., USA. These are described in the patent U.S. Pat. No. 6,387,470, the disclosure of which is incorporated herein by way of reference.

Figure 3:
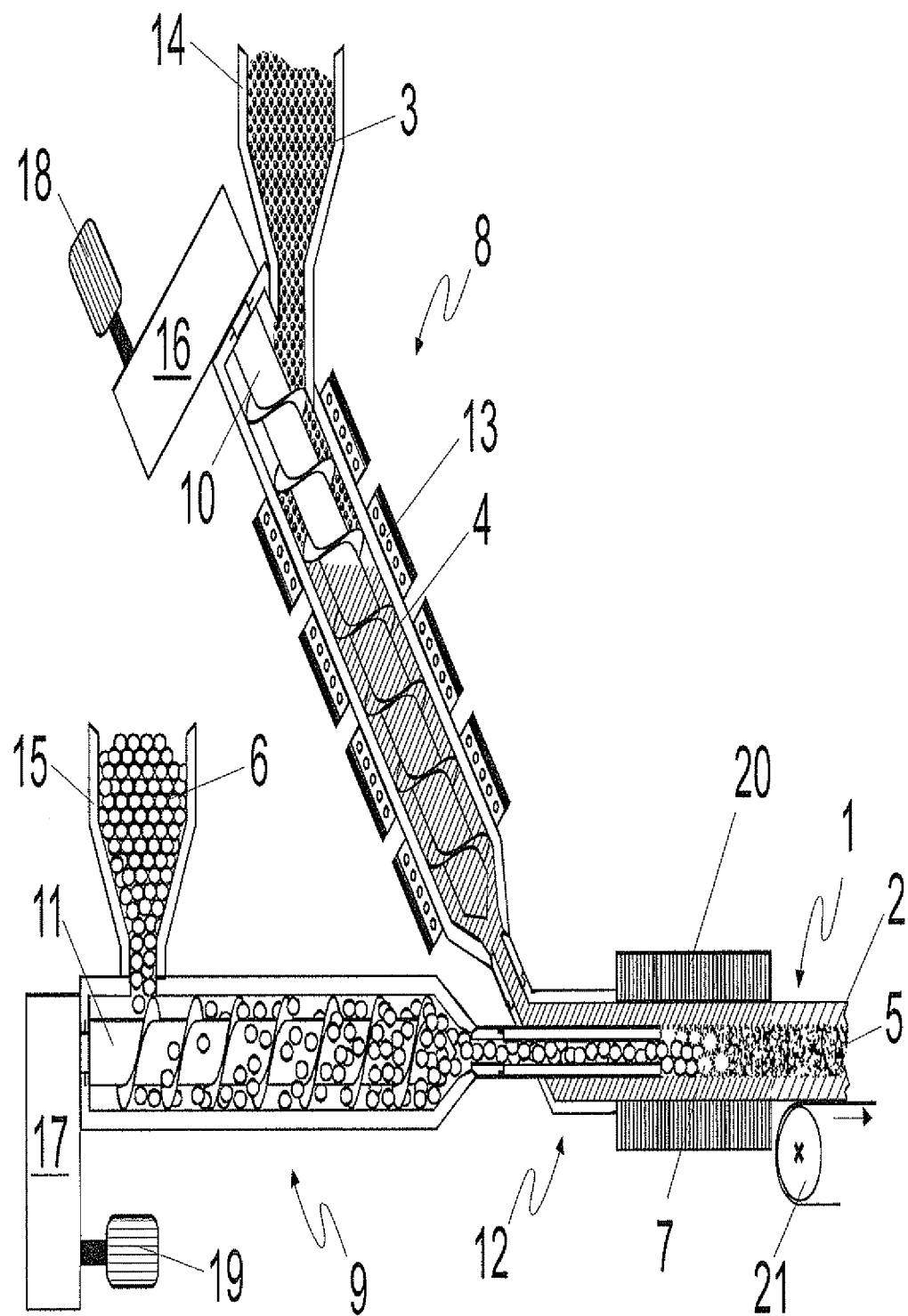
FIG. 3 is a diagram of a coextrusion process of the invention, for producing a plastics profile.

FIG. 3 is a diagram of a process of the invention for producing plastics profiles 1 with a foamed core 5.

A solid, thermoplastically processable plastic 3 is charged here to the hopper 14 of the first extruder. Said plastic 3 can be in any desired form here. In particular, the plastic is in the form of granules or of powder.

The plastic is preferably extruded at a temperature of from 150° C. to 350° C., in particular from 170° C. to 260° C., with preference from 180° C. to 220° C.

The plastic 3 passes through the hopper 14 into the interior of the first extruder 8, In the interior of the first extruder, the plastic is conveyed in the direction of a die 12 by means of a conveying screw 10, which is driven by a motor 18 by way of a transmission system 16, and at the same time the plastic is heated externally to a temperature above its melting point via heating elements 13 attached to the first extruder, and the plastic therefore melts. The molten plastic 4 is forced through the die 12, which has the cross-sectional shape of the profile to be produced.

In parallel with the process described above, the foamable material 6, in particular in the form of granules, is charged to the hopper 15 of the second extruder 9 and then passes by way thereof into the interior of the second extruder. In contrast to the first extruder, the second extruder is unheated, and the foamable material in the solid state is conveyed in the direction of the die 12 by means of a conveying screw, which is driven by a motor 19 by way of a transmission system 17.

The foamable material 6 is coextruded at the die into the cavity of the hollow plastics profile, where it comes into contact with the inner walls of the hollow plastics profile. The temperature here of the hollow plastics profile, which has been extruded from the melt preferably at a temperature of from 150° C. to 350° C., in particular of from 170° C. to 260°

C., with preference from 180° C. to 220° C., is sufficiently high to soften the foamable material and to cause it to foam thermally at a temperature 160° C., in particular from 80° C. to 150° C., preferably from 90° C. to 140° C., and to harden the same.

During the foaming procedure, the material 7, to some extent foamed, or the completely foamed material 5, exerts pressure on the hollow plastics profile from inside, and therefore bonds securely to the hollow plastics profile and constructs a very stiff and stable structure with high torsional strength. Introduction of the plastics profile 1 into a calibration device 20 here is intended to ensure that, prior to solidification of the plastic, the hollow plastics profile does not become deformed through the foaming procedure, but instead retains its prescribed cross-sectional shape.

The shapes of these calibration devices 20 are preferably precise negative forms of the exterior cross-sectional shape of the hollow plastics profile 2 to be produced, and, in addition to the pressure which the foamable material exerts here on the hollow profile by virtue of the foaming process, vacuum chambers distributed over the length of the calibration device can also be used here to suck the hollow plastics profile onto the calibrating inner wall. The calibration device can also be a cooled device, but care has to be taken here that the temperature in the interior of the plastics profile is sufficiently high to permit completion of the softening, foaming, and hardening process of the foamable material 6. The calibration device can, if appropriate, also be a heated device, with the aim of promoting the foaming procedure and/or the hardening procedure, at least in the region of entry of the plastics profile.

If appropriate, downstream of the calibration device, the plastics profile 1 passes through a separate cooling device, where by way of example it passes into a water bath or is sprayed by water sprays.

If need be, under certain conditions it is possible to use only a cooling device, instead of a calibration device 20. This is the case, for example, when the hollow plastics profile is cooled externally shortly prior to the start of the foaming procedure or simultaneously therewith, in such a way that it has completely solidified on the outside, but internally retains a temperature sufficient for the foaming procedure. The solidified exterior region here must be sufficiently firm to prevent impairment of the cross-sectional shape of the plastics profile during the foaming procedure.

At the end of the coextrusion process there is a take-off device 21, which takes the plastics profile 1 off at a constant velocity appropriate for the throughput of the extruder, and which then uses a cutter to separate the profile into sections of desired length.

The invention further encompasses a plastics profile which is produced by a process described above.

The invention also encompasses the use of plastics profiles which are produced by a process described above, as profiles for windows, doors, gates, flaps, hatches, and the like, in particular as window-leaf profiles and/or as window-frame profiles.

KEY

1 Plastics profile with foamed core
2 Hollow plastics profile or exterior profile
3 Plastic in solid state
4 Molten plastic
5 Core/foamed material
6 Foamable material
7 Partially foamed material
8 First extruder
9 Second extruder
10 Conveying screw of first extruder
11 Conveying screw of second extruder
12 Die
13 Heating element
14 Hopper of first extruder
15 Hopper of second extruder
16 Transmission system of first extruder
17 Transmission system of second extruder
18 Motor of first extruder
19 Motor of second extruder
20 Calibration device
21 Take-off device
22 Window-leaf profile
23 Window-frame profile
24 Glass pane

The invention claimed is:

1. A process for producing plastics profiles with a foamed core in a coextrusion process, the process comprising:
   coextruding a foamable material in a solid state into a cavity of a hollow plastics profile; and
   foaming the foamable material in the cavity of the hollow plastics profile, wherein the coextruding and foaming further comprise:
   i) charging a plastic in a solid state to a first heatable extruder;
   ii) melting and compressing the plastic during conveying by means of a conveying screw in a direction of a die;
   iii) extruding the molten plastic through the die to give a hollow plastics profile;
   iv) charging the solid, foamable material to a second extruder;
   v) conveying the foamable material in the solid state by means of a conveying screw in the direction of the die;
   vi) conveying the foamable material in the solid state into the cavity of the coextruded hollow plastics profile; and
   vii) foaming the foamable material to completion within the cavity of the hollow plastics profile,
   wherein the hollow plastics profile is cooled externally by a cooling device shortly prior to the conveying of the foamable material into the cavity of the coextruded hollow plastics profile in such a way that an outside of the hollow plastics profile has completely solidified but internally retains a temperature sufficient for the foaming of the foamable material.

2. The process as claimed in claim 1, wherein an extruding of a plastic of the hollow plastics profile is at a temperature of from 170° C. to 260° C. and the foamable material is thermally foamed at a temperature of ≤160° C.

3. The process as claimed in claim 2, wherein the plastic is polyvinyl chloride (PVC).

4. The process as claimed in claim 2, wherein the plastic takes the form of granules or powder.

5. The process as claimed in claim 1, wherein on leaving the die, the foaming of the foamable material occurs via the heat dissipated from the hollow plastics profile.

6. The process as claimed in claim 5, wherein the process further comprises:
   hardening the foamed material by the heat dissipated from the hollow plastics profile.

7. The process as claimed in claim 1, wherein the foamable material is in a form of granules.

8. The process as claimed in claim 1, wherein the foamable material comprises at least one chemical blowing agent.

9. The process as claimed in claim 1, wherein the process further comprises:

immediately after the coextrusion process, passing the plastics profile through a calibration device, in which a prescribed cross-sectional shape of the plastics profile is retained during the foaming of the foamable material.

10. The process as claimed in claim 1, wherein the process further comprises:
   after the coextrusion process, passing the plastics profile through a cooling device.

11. The process as claimed in claim 1, wherein the plastics profile is a window- or door-leaf profile or a window- or door-frame profile.

12. The process as claimed in claim 1, wherein the foamable material is a thermoset material.

13. The process as claimed in claim 12, wherein the foamable material is selected from a single component polyurethane composition that comprises blowing agents, and which is composed of crystalline polyesters having OH-groups in a mixture with other polyols and of polyisocyanates having blocked isocyanate groups.

14. The process as claimed in claim 1, wherein the foamable material is a composition comprising an ethylene-$\alpha,\beta$ ethylenically unsaturated carboxylic copolymer at least partially neutralized with a metallic ion, a blowing agent, and a resin based tackifier.

15. The process as claimed in claim 1, wherein the foamable material is a composition comprising a SBS block copolymer, a bisphenol A-based liquid epoxy resin, a polystyrene resin, a reinforcing agent, a blowing agent, and a curing agent.

* * * * *